Oct. 30, 1928.
J. T. LAWRENCE
1,689,733
STIRRING MECHANISM
Filed May 12, 1924
2 Sheets-Sheet 1
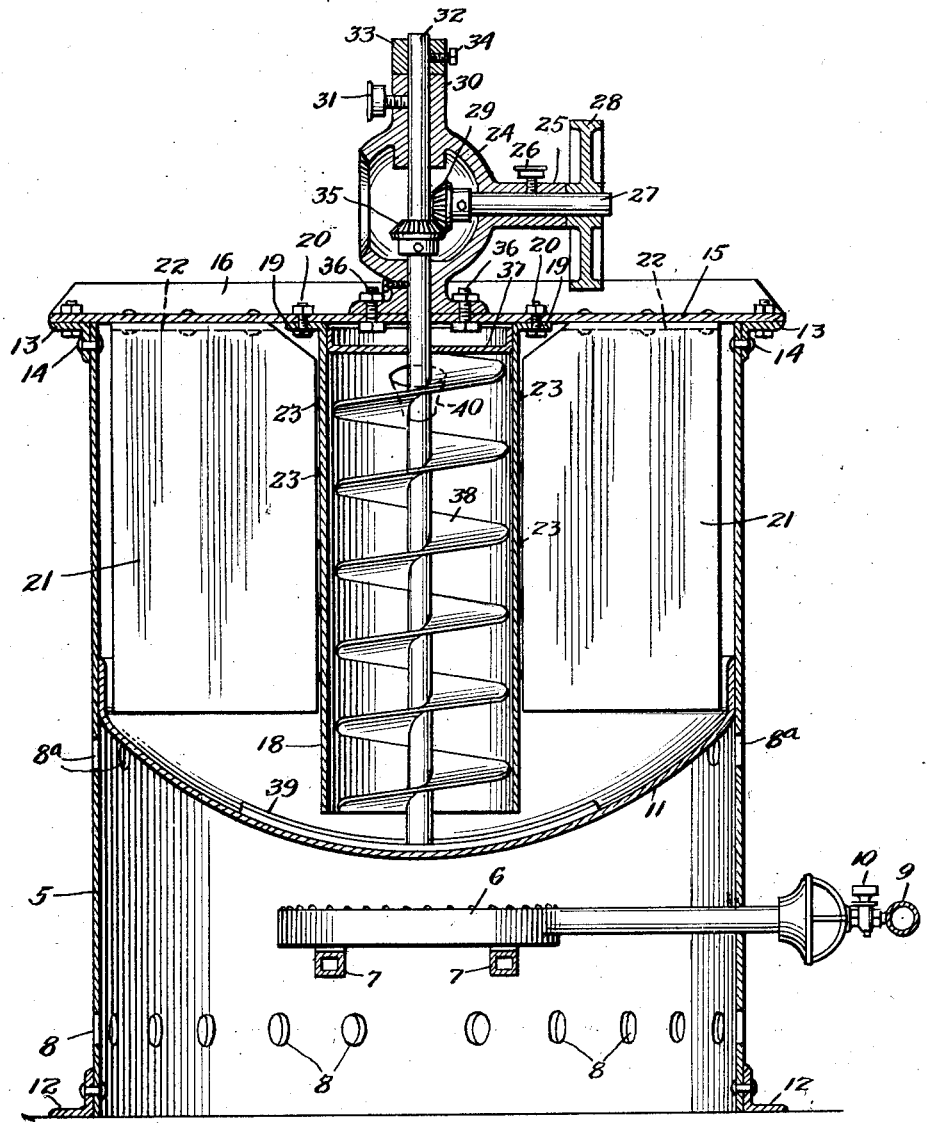
INVENTOR
J. T. LAWRENCE
BY Walton Harrison
ATTORNEY Oct. 30, 1928.
J. T. LAWRENCE
1,689,733
STIRRING MECHANISM
Filed May 12, 1924   2 Sheets-Sheet 2
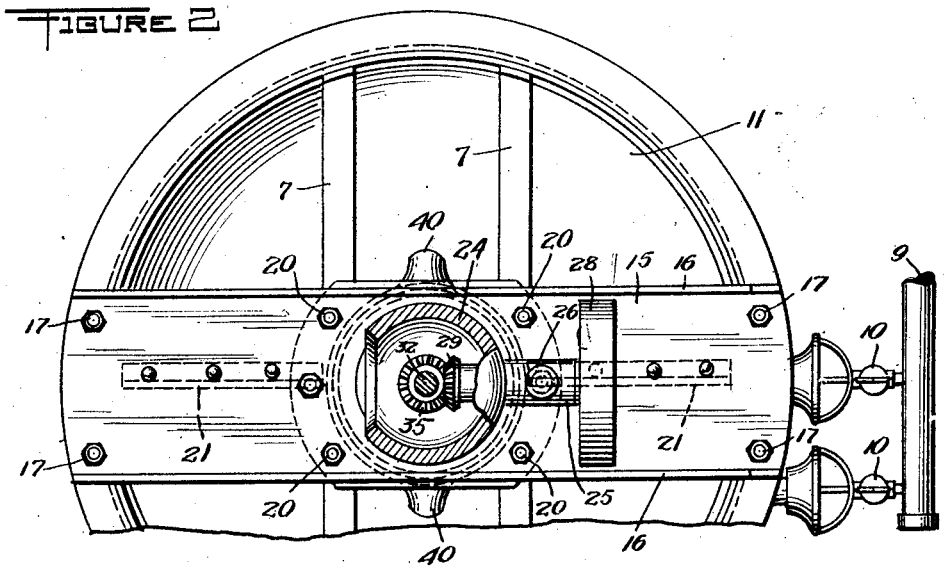
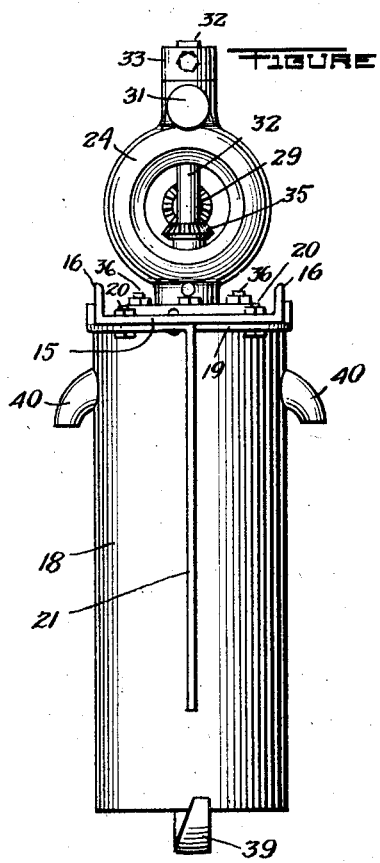
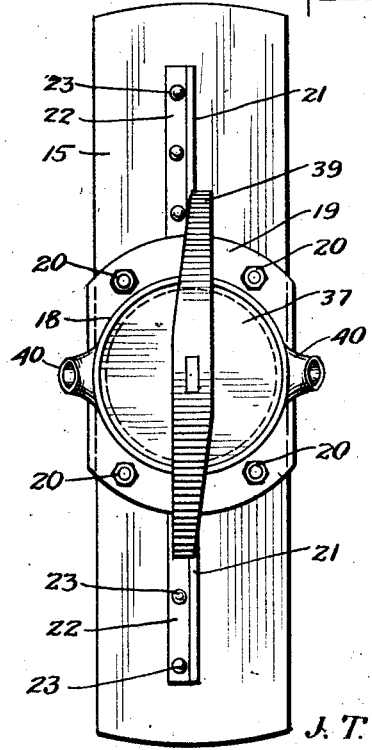
INVENTOR
J. T. LAWRENCE
BY Walton Harrison
ATTORNEY Patented Oct. 30, 1928.

1,689,733

UNITED STATES PATENT OFFICE.

JOSEPH TRIMBY LAWRENCE, OF JERSEY CITY, NEW JERSEY, ASSIGNOR TO MITCHELL-RAND MFG. CO., A CORPORATION OF NEW YORK.

STIRRING MECHANISM.

Application filed May 12, 1924. Serial No. 712,508.

My invention relates to stirring mechanism, my more particular purpose being to produce a device of simple construction, and made up of parts readily standardized and easily assembled, for the thorough and rapid mixing, agitating, and emulsifying of liquids and plastic materials, whether heated or unheated.

My invention further contemplates a device of the character just stated, and so constructed as to receive the raw materials, and also to deliver the mixed material or finished product, while the device is in active operation.

My invention further contemplates the provision of movable parts so constructed and arranged as to prevent the material from burning while being stirred or mixed, and also to prevent the materials operated upon from sticking to the bottom of the vessel in which the mixture takes place.

In addition, my invention further contemplates grouping together various active elements of the stirring mechanism, and mounting them together as a unit upon a supporting beam, this supporting beam being detachable relatively to the kettle or other vessel in which the stirring is done, the said supporting beam and the movable parts carried thereby being thus as a unit removable from the kettle or other vessel in which the mixture is made.

My invention also contemplates various improvements in stirring mechanisms generally, for the purpose of increasing the general efficiency thereof.

Reference is made to the accompanying drawing forming a part of this specification, and in which like reference characters indicate like parts throughout all of the figures.

Figure 1 is a substantially vertical section through my improved stirring mechanism.

Figure 2 is a fragmentary view of the same, and is partly in plan and is partly in section.

Figure 3 is a side elevation showing a group of mechanism comprising a number of movable parts carried by a cross beam, and therewith constituting a removable unit.

Figure 4 is an inverted plan of the mechanism appearing in Figure 3.

A mixing vessel is shown at 5, and has generally the form of a short cylinder extending vertically.

Located within the mixing vessel 5 is a heater 6, having in this instance the form of a gas burner, which rests upon a pair of cross bars 7.

For supplying the heater with air and permitting the escape of smoke and burned gases, a number of holes 8 and $8^a$ are provided. The fuel is supplied by gas from a pipe 9, this gas being under control of hand valves 10, of the usual or any desired construction.

The mixing vessel 5 is provided with a floor 11, rounded as indicated in Figure 1, and serving as a bottom for supporting the material to be stirred. Thus the floor 11 and the upper portion of the mixing vessel together constitute a kettle.

The mixing vessel 5 is provided with an annular flange 12, encircling its bottom and serving as a base ring. The mixing vessel is also provided with another annular flange 13, encircling its top edge and serving as a supporting flange. A cross beam 15, provided with a pair of upwardly extending flanges 16, rests across the top of the mixing vessel and by means of bolts 17 is detachably secured to the supporting flange 13. By removing the bolts 17 the supporting beam 15 may be disconnected from the mixing vessel.

A cylinder 18, standing vertically and open at its lower end as indicated in Figure 1, is at its upper end provided with a flange 19, integral with it and of annular form. By means of bolts 20, this flange is secured upon the under side of the supporting beam 15.

Mounted upon opposite sides of the cylinder 18 are a pair of baffle plates 21, provided with supporting flanges 22, these flanges being secured to the under side of the supporting beam 15. The baffle plates are by means of spot weldings 23 secured to the cylinder 18. Thus the cylinder and baffle plates mutually brace each other, and by so doing tend to render these parts rigid and firm relatively to the supporting beam 15 and to the other parts. A gear casing is shown at 24, and in this instance has the form of a single casting. Integral with it and extending horizontally from it is a cylindrical bar 25, provided with a grease cup 26.

Extending axially through the cylindrical bearing 25 is a revoluble driving shaft 27, carrying a pulley 28, secured upon it and revoluble with it. Mounted upon the shaft 27 and located within the gear casing 24 is a bevel gear 29.

The gear casing 24 is further provided with a portion 30 integral with it and extending upward, this portion being formed into a cylindrical bearing. A grease cup 31 is mounted upon this bearing.

A revoluble shaft 32 extends through the gear casing 24 and thus through the cylindrical bearing just mentioned, and carries a collar 33 located adjacent its upper end, and held in position by a set screw 34. The revoluble shaft 32 carries a bevel gear 35, secured rigidly upon it and meshing with the bevel gear 29.

By means of bolts 36 the gear casing is secured upon the supporting beam 15. Fitted into the top of the cylinder 18 and secured thereto is a guard plate 37, through which the shaft 32 extends. This guard plate serves to some extent as a bearing for the shaft 32, but is mainly used as a baffle to limit the upward passage, through the cylinder 18, of the materials being mixed.

Mounted rigidly upon the shaft 32 is a conveyor thread 38, and a scraper blade 39 is secured rigidly upon the lower end of the shaft. Thus the scraper blade and the conveyor thread rotate with the shaft.

The cylinder 18 is provided with discharge spouts 40. While I show only two of these spouts, and these extend in opposite directions, it is obvious that any larger number of spouts may be employed, and that they may extend in different directions.

The spouts 40 are so formed and located as to discharge the materials mixed by the machines and carried up through the cylinder 18 by action of the conveyor thread 38.

When power is applied to the pulley 28, the latter is rotated so as to turn the driving shaft 27, and thus cause the bevel gear 29 to rotate and turn the bevel gear 35. This causes rotation of the shaft 32 and parts carried thereby, these parts acting together as a conveyor mechanism.

The speed at which the device is driven may be varied according to the nature of the materials operated upon.

In practice it is found that as soon as the movable parts are in motion, so that the conveyor mechanism begins to lift the materials from the bottom of the kettle, and pour them out through the spouts 40, the mixing is almost instantaneous and is very thorough.

In operating upon a mixture of composite materials, the constant pumping of these materials from the bottom of the kettle, and pouring them out upon the top of the cold materials contained within the kettle, has a marked tendency to facilitate the melting of the materials as well as the mixture thereof. In this connection the work of the scraper blade is quite important, as it serves to a great extent in diffusing and equalizing the heat throughout the molten mass as a whole.

The apparatus may be used for the rapid and thorough mixing of many different liquids and semi-liquids.

If in a particular instance no heat is required, the heating mechanism simply remains idle.

The device is well adapted for emulsifying oil and grease compounds, as well as for the intimate mixture of asphalts, pitches, resins, waxes, and the like, with each other, or with other materials, and especially with materials containing mineral matter, and thereby having a tendency to settle down in the bottom of the kettle.

With this apparatus it is practicable to thoroughly mix many materials containing ingredients in which the specific gravity varies considerably.

The operation of my device may be readily understood from the foregoing description.

The materials to be mixed are placed in the kettle, and the heater 5 is brought into action so as to raise the temperature of the kettle and its contents.

Power now being applied to the pulley 38, the various revoluble parts are turned as above stated and the conveyor mechanism is thus brought into action. The shaft 32 turns in such direction that the materials within the cylinder 18, usually in liquid or plastic form, are forced upwardly and out through the spouts 40, so as to pour out continuously from the spouts and thus flow back into the general mass of material contained in the kettle.

The baffle plates 21 being stationary, no appreciable rotary motion is conferred upon the main bulk or body portion of the material encircling the cylinder 18.

The scraper blade 29, by continuously agitating the material in close proximity to the floor 11 serving as the bottom of the kettle, prevents the material from burning, and also from caking in consequence of the high temperature at this point.

The various parts are so formed and arranged that workmen, provided with hand buckets, can fill the latter directly from the spouts. This avoids all necessity for dipping the buckets into the liquid material contained in the kettle, and thus prevents the buckets from becoming caked or clogged with the material, as would ordinarily be the case, especially with cold buckets. If desired, one set of workmen can continuously charge the raw materials into the kettle upon one side of the supporting beam 15, and a different set of workmen can continuously remove the finished material from the kettle at points located upon the opposite side of the supporting beam.

Again, if it be so desired, the raw material may be supplied to the machine by power, the delivery being either continuous or intermittent as required; and the finished material, in liquid or plastic form as the case may be, may be removed either continuously or intermittently by hand or by power.

Since as above described the supporting beam 15 can be disconnected from the flange 13 by merely removing the posts 17, it follows that the supporting beam and all parts carried thereby may as a unit be removed bodily from the kettle. This feature is of advantage in facilitating the inspection and repair of the various parts.

I do not limit myself to the precise mechanism shown, nor to any particular materials upon which the machine is to operate, the scope of my invention being commensurate with my claims.

Having thus described my invention, what I claim as new and desire to secure by Letters Patent is as follows:

1. A device of the character described comprising a kettle, a supporting beam extending across said kettle and detachably secured thereto, a cylinder mounted upon said supporting beam and extending downwardly therefrom into said kettle nearly but not quite to the bottom thereof, said cylinder being normally stationary and being provided with spouts extending outwardly and downwardly from it in order to direct the flow of loose material downwardly from the top of said cylinder into said kettle, a guard plate mounted within upper portion of said cylinder, a revoluble shaft extending through said guard plate and axially downward through said cylinder, a conveyor thread carried by said shaft and located within said cylinder in order to crowd loose material against said guard plate and thus to cause the discharge of said loose material from said spouts, and means for turning said revoluble shaft.

2. A device of the character described comprising a kettle, a supporting member extending thereover, a cylinder connected with said supporting member and extending downwardly therefrom, said cylinder being provided with spouts and therewith being normally stationary, said spouts being suitably positioned to guide the flow of loose material from top of said cylinder downwardly into said kettle, a guard plate fitted into the upper portion of said cylinder and closing the same, a revoluble shaft extending through said guard plate and into said cylinder, a conveyor thread carried by said shaft and located within said cylinder in order to force loose material up into said cylinder and against said guard plate, and thus to cause the discharge of said loose material from said spouts, means for turning said revoluble shaft, a hollow gear casing mounted upon said supporting member, and gearing carried by said hollow gear casing and connected with said revoluble shaft, for turning the same.

Signed at New York city, in the county of New York and State of New York, this 9th day of May, 1924.

JOSEPH TRIMBY LAWRENCE.